United States Patent

[11] 3,607,978

[72] Inventors Yoon Chai Lee;
Quirino A. Trementozzi, both of Springfield, Mass.
[21] Appl. No. 788,911
[22] Filed Jan. 3, 1969
[45] Patented Sept. 21, 1971
[73] Assignee Monsanto Company
St. Louis, Mo.

[54] NITRILE POLYMERIC BLENDS
9 Claims, No Drawings

[52] U.S. Cl. ................................................. 260/876 R,
260/4 R, 260/78.5 N, 260/878 R, 260/879,
260/880 R, 260/885, 260/887, 260/893, 260/898
[51] Int. Cl. .................................................. C08f 37/18,
C08f 41/12
[50] Field of Search ........................................... 260/876,
898, 887, 893, 880

[56] References Cited
UNITED STATES PATENTS
| | | | |
|---|---|---|---|
| 3,260,709 | 7/1966 | Nield............................ | 260/898 |
| 3,438,971 | 4/1969 | Walker......................... | 260/876 |
| 3,451,538 | 6/1969 | Trementozzi................. | 260/876 |

Primary Examiner—Murray Tillman
Assistant Examiner—H. Roberts
Attorneys—H. B. Roberts, A. E. Hoffman and P. J. Hogan ABSTRACT: A polymeric blend is prepared from a nitrile polymer and a modifying polymer containing dicyanobutene-1. The modifying polymer greatly improves the processability of the nitrile polymer while maintaining or improving the barrier properties thereof, and products molded from the blends exhibit better optical characteristics than products similarly produced from the unmodified nitrile polymer.

NITRILE POLYMERIC BLENDS

BACKGROUND OF THE INVENTION

Polymers prepared from a major amount of a nitrile monomer such as acrylonitrile, methacrylonitrile, etc., have been found to possess many desirable properties including particularly outstanding oxygen and water-vapor barrier characteristics. Their widespread use has been limited, however, largely because of the difficulties in molding, extruding and otherwise processing the resin, and because of the undesirable coloration which tends to occur in the products produced therefrom.

Numerous processing aids are available and have been employed in the nitrile polymers, but, so far as is known, none of the resins so produced have been entirely satisfactory for extensive commercial application. Although the processing characteristics of the polymer can be improved by various processing aids, normally the levels of improvement achieved are not adequate and/or the presence of the processing aid seriously detracts from other desirable properties of the matrix resin including chemical and heat resistance and particularly the barrier properties thereof.

Accordingly, it is an object of the present invention to provide novel physical blends of nitrile polymers wherein a desirable balance of physical properties and processing characteristics is obtained.

It is also an object to provide nitrile polymeric blends adapted to use in packaging and other applications and which exhibit low gas permeability along with good processing characteristics.

Still another object is to provide novel blends of nitrile polymers from which superior molded and extruded products can be produced conveniently and relatively economically.

SUMMARY OF THE INVENTION

It has now been found that the foregoing and related objects may be readily attained in a blend comprising about 55.0 to 97.0 weight percent of a nitrile polymer and about 45.0 to 3.0 percent by weight of a modifying polymer compatible therewith. The nitrile polymer contains at least 15.0 percent by weight of an ethylenically unsaturated nitrile selected from the group consisting of acrylonitrile, methacrylonitrile, and mixtures thereof; the modifying polymer contains at least 5.0 percent by weight of dicyanobutene-1 and may contain up to 95.0 percent by weight of at least one copolymerizable monomer selected from the class consisting of ethylenically unsaturated nitriles, monovinylidene aromatic hydrocarbons, alkyl (alk)acrylates, dialkyl maleates and dialkyl fumarates. At least about 60.0 percent by weight of the blend is comprised of monomers containing the cyanide group. There may be included in the blend a rubbery polymer which is either grafted by the dycanobutene-1 polymer or by the nitrile polymer or which is physically admixed therewith, the total concentration of such a rubber being limited to not more than about 20.0 percent by weight of the blend.

DETAILED DESCRIPTION OF THE PREFERRED EMBODIMENTS

As indicated, the blends of the present invention comprise a nitrile polymer and a modifying polymer of dicyanobutene-1. The blend contains about 3.0–45.0 weight percent of the dicyanobutene-1 polymer and about 97.0–55.0 percent of the nitrile polymeric matrix. Preferably, the modifying polymer is an interpolymer with at least 20.0 weight percent of at least one copolymerizable monomer, and comprises about 5.0 to 30.0 percent of the blend; most desirably it is about 10.0 to 20.0 percent of the blend for optimum properties and processability. In addition as has been mentioned, it is important that at least 60.0 weight percent of the blend be provided by a cyanide-containing compound, including the ethylenically unsaturated nitriles, dicyanobutenes, etc. The source of the cyanide compound is not critical, and it may be in the matrix or modifying polymers, or in included rubbers, whether grafted or not.

The Nitrile Polymer

The polymer which serves as the matrix is an unsaturated nitrile polymer, i.e., a polymer containing at least 15.0 percent by weight of an ethylenically unsaturated nitrile of the group consisting of acrylonitrile, methacrylonitrile and mixtures thereof. Suitable matrix polymers include homopolymers of these unsaturated nitriles as well as interpolymers of at least 15.0 percent by weight of one or more of them with up to 85.0 percent by weight of one or more copolymerizable monomers. Exemplary of such monomers are other ethylenically unsaturated nitriles such as ethacrylonitrile and propacrylonitrile, monovinylidene aromatic hydrocarbons (e.g., styrene; ar-alkylstyrenes such as the o-, m-, and p-methylstyrenes, 2,4-dimethylstyrene ar-ethylstyrenes, p-t-butylstyrene, etc.; alpha-alkylstyrenes such as alpha-methylstyrene, alpha-ethylstyrene, alpha-methyl-p-methylstyrene, etc.; vinyl naphthalene, and mixtures thereof), alkyl (alk)acrylates (e.g., methyl acrylate, ethyl acrylate, propyl acrylate, butyl acrylate, 2-ethylhexyl acrylate, the corresponding alkyl methacrylates, etc.; and mixtures thereof), acrylamides (e.g., acrylamide; methacrylamide; N-alkyl acrylamides such as N-methyl acrylamide, N-butyl acrylamide, etc.; and mixtures thereof), dialkyl maleates and fumarates (e.g., diethyl maleate, dibutyl fumarate, etc., and mixtures thereof), etc. Many other unsaturated nitrile polymers which contain at least 15.0 percent by weight of combined unsaturated nitrile and which present a processing and coloration problem because of their unsaturated nitrile content will be obvious to those skilled in the art. Normally the matrix polymer will contain at least 50.0 percent, and preferably at least 75.0 percent, by weight of acrylonitrile and/or methacrylonitrile to achieve the desired level of gas permeation resistance.

Exemplary of the nitrile polymers which may be used advantageously in accordance with the present invention are acrylonitrile homopolymer; methacrylonitrile homopolymer; copolymers of acrylonitrile/methacrylonitrile, acrylonitrile/styrene, methacrylonitrile/styrene, acrylonitrile/methacrylonitrile/styrene, acrylonitrile/alpha-methylstyrene, methacrylonitrile/alpha-methylstyrene, acrylonitrile/ethacrylonitrilealpha-methylstyrene, ethacrylonitrile/alpha-methylstyrene, acrylonitrile/isobutylene, methacrylonitrile/isobutylene, acrylonitrile/vinyl acetate, acrylonitrile/methyl methacrylate, methacrylonitrile/ethacrylonitrile/alpha-methylstyrene, etc.; interpolymers containing four or more of the hereinbefore enumerated monomers may also be employed. (e.g., ar-alkylstyrene,such as the o-, m- and p-methyl-styrenes 2,4-dimethylstyrene, the ar-ethylstyrenes, p-tert-butylstyrene, alpha-methyl-p-

A portion of the unsaturated nitrile polymer may be grafted onto a rubbery substrate if so desired by polymerizing the nitrile monomer or mixture thereof with copolymerizable monomers in the presence of a preformed rubbery polymer. Numerous rubbery polymers may be used for this purpose and are enumerated hereinafter; however, for best results it is highly desirable that the substrate rubber contain at least some unsaturation to facilitate grafting. Thus, the term "nitrile polymer" as used herein includes graft copolymer blends as well as the ungrafted ethylenically unsaturated nitrile homopolymers and copolymers. Normally, the matrix resins employed herein will have weight average molecular weights of at least about 150,000. Although the presence of the modifying polymer is beneficial in all matrices described herein, it is particularly beneficial with the acrylonitrile polymers and the matrices having weight average molecular weights of 250,000 and above.

The Modifying Polymer

The modifying polymers which are blended with the nitrile polymers to attain the objects of this invention contain at least about 5.0 percent by weight of one or a mixture of butene-1 compounds dicyano-substituted in the 1,3-, 1,4-, or 2,4-positions. Normally the percentage of dicyanobutene-1 in the modifying polymer will not exceed 80.0 percent by weight due to economics and the difficulty of preparing polymers containing such monomers in a high weight percentage. Preferably the amount of the dicyanobutene-1 in the interpolymer is 10.0 to 50.0, and most desirably about 25.0 to 40.0, percent by weight thereof. The copolymerizable monomer(s) of the dicyanobutene polymer may comprise about 95.0 to 20.0, preferably about 90.0 to 50.0 and most desirably about 75.0 to 60.0, percent by weight thereof. Exemplary of the monomers copolymerizable with the dicyanobutenes are the ethylenically unsaturated nitriles (e.g., acrylonitrile, methacrylonitrile, ethacrylonitrile, propacrylonitrile, butacrylonitrile); the monovinylidene aromatic hydrocarbons (e.g., styrene; ar-alkylstyrenes such as the 0-, m-, and p-methylstyrenes, 2,4-dimethylstyrene, ar-ethylstyrenes, p-t-butylstyrene, etc.; alpha-alkylstyrenes such as alpha-methylstyrene, alpha-ethylstyrene, alpha-methyl-p-methylstyrene, etc.; vinyl naphthalene; ring chlorinated derivatives of the foregoing monovinylidene aromatic hydrocarbons); alkyl (alk)acrylates (e.g., methyl acrylate, ethyl acrylate, propyl acrylate, butyl acrylate, 2-ethylhexyl acrylate, the corresponding alkyl methacrylates, etc.); dialkyl maleates and fumarates (e.g., diethyl maleate, dibutyl fumarate, etc., and mixtures thereof), and mixtures of one or more of the monomers exemplified by the foregoing list may be used. Particularly preferred are the copolymerizable monomers of the group consisting of styrene, alpha-methyl styrene, acrylonitrile, methacrylonitrile, methyl methacrylate, and mixtures thereof. Although the dicyanobutenes may properly be considered nitriles, distinction is drawn herein between them and the mononitriles such as acrylonitrile, methacrylonitrile, etc., herein termed "ethylenically unsaturated nitriles."

A proportion of the preformed rubbery polymer, grafted with the modifying polymer, may also be incorporated therein by effecting the polymerization of the monomers in the presence of the rubber. From a practical standpoint, the dicyanobutene polymers of the invention should contain no more than about 20.0 percent by weight of the grafted rubber, and, when a rubber is included in the interpolymer, preferably it will be present in an amount of about 5.0–15.0 percent. As in the case of a graft of the matrix monomers, numerous rubbers may be used in the modifying polymer but they most desirably contain some unsaturation to facilitate grafting. Exemplary of the rubbers which are suitable substitutes in both the matrix and the modifying polymer are diene rubbers, natural rubbers, ethylene-propylene terpolymer rubbers, other rubbery olefin polymers such as ethylene-vinyl acetate and ethylene-octyl acrylate, and acrylate rubbers, such as butyl acrylate and 2-ethylhexyl acrylate, synthetic polyisoprene rubbers, and mixtures thereof. It will be appreciated that such rubbers include not only homopolymers of the specifically identified constituents but also interpolymers which may be characterized primarily as the aforementioned rubbers.

The preferred substrates, however, are diene rubbers (including mixtures of diene rubbers), i.e., any rubbery polymer (a polymer having a second order transition temperature not higher than 0° C., preferably not higher than −20° C., as determined by ASTM Test D–746–52T) of one or more of the conjugated 1,3-dienes, e.g., butadiene, isoprene, piperylene, chloroprene, etc. Such rubbers include homopolymers and interpolymers of conjugated 1,3-dienes with up to an equal amount by weight of one or more copolymerizable monoethylenically unsaturated monomers such as monovinylidene aromatic hydrocarbons e.g., styrene; an ar-alkylstyrene, such as the o-, m- and p-methyl-styrenes 2,4-dimethylstyrene the ar-ethylstyrenes, p-tert-butylstyrene, etc., an alpha-methylstyrene, alpha-ethylstyrene, alpha-methyl-p-methylstyrene, etc.; vinyl naphthalene, etc.); ar-halo monovinylidene aromatic hydrocarbons (e.g., the o-, m- and p-chlorostyrenes, 2,4-di-bromostyrene, 2-methyl-4-chlorostyrene, etc.); acrylonitrile; methacrylonitrile; alkyl acrylates (e.g., methyl acrylate, butyl acrylate, 2-ethylhexyl acrylate, etc.), the corresponding alkyl methacrylates; acrylamides (e.g., acrylamide, methacrylamide, N-butylacrylamide, etc.); unsaturated ketones (e.g., vinyl methyl ketone, methyl isopropenyl ketone, etc.); alpha-olefins (e.g., ethylene, propylene, etc.; pyridines; and the like.

A preferred group of rubbers are those consisting essentially of 75.0–100.0 percent by weight of butadiene and/or isoprene and up to 25.0 percent by weight of a monomer selected from the group consisting of monovinylidene aromatic hydrocarbons (e.g., styrene), and unsaturated nitriles (e.g., acrylonitrile), or mixtures thereof. Particularly advantageous substrates are butadiene homopolymers or interpolymers of 80.0–95.0 percent by weight butadiene and 5.0–20.0 percent by weight of acrylonitrile or styrene.

OPTIONAL COMPONENTS

The blends of the present invention may be comprised solely of the nitrile polymeric matrix and the modifying dicyanobutene polymer. However, significant advantages may often be realized when additional components are included in the blends. If neither the modifying polymer nor the matrix polymer is a graft copolymer blend, it may be desirable to admix an impact modifier with the other two components to improve the physical properties of the products produced from the blends, such as toughness, even through desirable physical improvements may be obtained simply by blending the dicyanobutene-1 polymer with the nitrile resin. In such a case the impact modifier may be one of the previously mentioned rubbers evidencing sufficient compatibility, or preferably a graft copolymer such as the ABS (acrylonitrile and styrene grafted upon a rubbery diene substrate) and MBS (methyl methacrylate and styrene grafted upon a rubbery diene substrate). Regardless of the source or mode of introduction of the rubbery polymer, the total amount thereof should not exceed about 20.0 percent of the total weight of the blend; preferably the amount thereof will not be in excess of about 15.0 weight percent.

Other optional additives may also be included in the blends of the invention, such as fillers, plasticizers, stabilizers, antioxidants and lubricants. The desirability of such additives will depend upon the characteristics of the blend and upon the optimum balance between economy and properties which can be attained thereby.

The copolymers and interpolymers employed in accordance with this invention may be prepared by any suitable method conventionally employed for the production of polymers of that type. Thus, the polymers may be prepared en masse, in solution, suspension, emulsion or by a combined mass/suspension technique; however, the aqueous dispersion techniques are preferred.

Conventional agents for forming an emulsion of the monomers in water will be employed in the case of an emulsion polymerization process, exemplary of which are the fatty acid soaps, alkali metal or ammonium soaps of high molecular weight, alkyl or alkaryl sulfonates and sulfates, etc. On the other hand, if a suspension technique is employed suitable suspension aids include the alkali metal salts of organic sulfonic acids, alkyl phenol/polyhydric alcohol condensation products, oil-soluble quaternary ammonium salts, water-soluble cellulose derivatives, etc.

Although thermally initiated reactions may be feasible, preferably a small amount of a catalytic initiator is employed. Actinic radiation and both water-soluble and monomer-soluble peroxy-type catalysts, with or without a reducing agent to form a redox system, may be used for the polymerization reaction with variable efficacy depending upon the particular polymerization technique employed. In some emulsion polymerization processes, it is advantageous to use a redox system since it permits the use of slower catalysts with equivalent conversion periods.

Exemplary of the water-soluble peroxy catalysts are the alkali metal peroxides; the alkali metal and ammonium persulfates, perborates, peracetates and percarbonates; and hydrogen peroxide. Exemplary of the monomer-soluble peroxy and perazo compounds are di-tert-butyl peroxide, dibenzoyl peroxide, di-lauroyl peroxide, di-oleyl peroxide, di-toliyl peroxide, di-tert-butyl diperphthalate, di-tert-butyl peracetate, di-tert-butyl perbenzoate, dicumyl peroxide, di-tert-butyl peroxide, di-isopropyl peroxydi carbonate, 2,5-dimethyl-2, 5-di(tert-butylperoxy) hexane, 2,5-dimethyl-2,5-di(tert-butylperoxy)hexyne-3, di-tert-butyl hydroperoxide, cumene hydroperoxide, p-menthane hydroperoxide, cyclopentane hydroperoxide, diisopropylbenzene hydroperoxide, p-tert-butyl-cumene hydroperoxide, pinane hydroperoxide, 2,5-dimethylhexane-2,5-dihydroperoxide, etc.; azo-di-isobutyonitrile and mixtures thereof.

The catalyst is generally included within the range of 0.001 to 2.0 percent by weight, and preferably on the order of 0.005 to 1.0 percent by weight of the polymerizable material, depending upon the monomers, the polymerization technique, and the desired polymerization cycle. An excess of catalyst during the initial period of polymerization will tend to favor the grafting reaction if a rubbery substrate is included.

Exemplary of the reducing agents which may be employed are alkali metal and ammonium sulfites, hydrosulfites, metabisulfites, thiosulfates, sulfinates, formaldehydesulfoxylates or ascorbic acid, dioxyacetone, dextrose, etc. Various other reducing agents for redox systems may also be employed.

The amount of reducing agent will be about 0.001 to 1.0 percent by weight, and preferably on the order of 0.005 to 0.5 percent by weight, of the polymerizable monomer formulation, depending on the catalyst and the amount thereof. For redox systems, minute amounts of activators or promoters such as ferrous salts, cobalt and copper salts may be included.

Although it is possible to achieve substantially complete conversion of monomer to polymer (i.e., 100 percent) in certain of the formulations described herein, normally it is most economical and convenient to terminate the reaction short of completion, at about 85.0 to 90.0 percent conversion; generally the percentage of monomer converted will not be less than about 65.0. The cycle times for the reaction may vary widely and will depend upon the particular techniques, reactants and initiator employed, but usually the reaction will be considered complete at the end of about a 5- to 24- hour period. The suitable temperature for reaction will also vary considerably, but will usually fall within the range of about 50° to 150° C.

BLENDING TECHNIQUES

The final polymer blends may be prepared by admixing the components thereof in any of the customary ways including mill-rolling, extrusion-blending, high-intensity mixing, etc. When the polymers are prepared by emulsion processes, the latices thereof may be admixed and the mixed latex spray dried or coagulated. It will be appreciated that the blends may be formed in the equipment for forming the product to be made therefrom such as an extruder when the resin components are of the desired particulate form. The conditions of molding or extrusion are generally the same as those which are used for comparable polymers, the processing temperature of the stock normally being in the range of about 350° to 450° F. However, these factors will depend somewhat upon the components and resultant blend properties.

Exemplary of the efficacy of the present invention are the following specific examples wherein all parts and percentages are on a weight basis unless otherwise specified.

Example One

About 80 parts of a copolymer containing about 90.0 percent of methacrylonitrile and about 10.0 percent of styrene, copolymerized in a conventional manner, is blended in a high-speed mixer with about 20 parts of an interpolymer containing about 70.0 percent methacrylonitrile, 20.0 percent styrene and 10.0 percent 2,4-dicyanobutene-1. The interpolymer is prepared by an emulsion polymerization technique utilizing about 3.0 percent, based upon the weight of polymerizable monomers in the formulation, of an emulsifying agent. The catalyst employed is potassium persulfate and the reaction is effected it about 75° C. for about 9 hours until approximately 90 percent of the monomers are polymerized.

Portions of this blend are subjected to testing in a capillary rheometer to determine the force necessary to achieve specified shear rates. Similar tests are performed utilizing specimens of the same methacrylonitrile/styrene (90/10) copolymer from which any modifying polymer is omitted. In the apparatus used for testing the capillary diameter is 0.0495 inch, the length:diameter ratio is 10:1 and the entrance angle is 90°; the temperature of the material during the tests is maintained at about 380° F.

Each of the specimens is tested at three shear rates, i.e., 10, 100 and 1,000 second[11], , and the force necessary to maintain these rates is measured. Utilizing this information, the shear stresses and the apparent viscosities of each of the specimens is determined at each of the shear rates, and that data is set forth is table one. Since these properties of the materials are directly related to the processability thereof (i.e., the lower the shear stress and the apparent viscosity of the material tested, the better will be is processability), these data indicate the very significant improvements in processability which are attained by the present invention.

TABLE ONE

| Shear rate (second$^{-1}$) | Shear stress (p.s.i.) | | Viscosity (lb. sec./in.$^2$) | |
|---|---|---|---|---|
| | Blend | Unmodified polymer | Apparent blend | unmodified polymer |
| 10 | 36 | 92 | 5.8 | 8.7 |
| 100 | 75 | 270 | 1.0 | 2.2 |
| 1,000 | 250 | 450 | 0.2 | 0.4 |

In all instances, the level of degradation producing coloration in the blends is found to be significantly lower than in the unmodified copolymer, and the clarity of the specimens from the blends is excellent. In addition, gas permeation tests performed utilizing films formed in a heated hydraulic press from each of the foregoing materials show that in no case is the resistance to the passage of gas, i.e., oxygen and water vapor, impaired significantly by the presence of the modifying copolymer. Thus, the blends of the present invention provide a film suitable for use as a packaging material where oxygen and water vapor barrier characteristics are required.

Example Two

Two series of tests are performed generally in accordance with example one; in one series, a copolymer containing about 25.0 percent of styrene and about 75.0 percent of 2,4-dicyanobutene-1 is substituted and in the other series a copolymer containing about 75.0 percent of methacrylonitrile and 25.0 percent of a mixture of 1,4-dicyanobutene-1 and 2,4-dicyanobutene-1 is used. In the first series, the matrix and modifying polymers are blended in same proportion as is used in example one; in the second series, about 30.0 percent of the modifying polymer is blended with about 70.0 percent of the nitrile polymer.

In all instances, the present of the modifying copolymers produces significant improvements in processability. The molded products exhibit good levels of clarity and freedom from coloration, and there is no appreciable reduction in the resistance to gas permeation through films produced from the blends.

Example Three

A blend is prepared in the manner of example one by mixing about 15 parts of a copolymer containing about 40.0 percent of 2,4-dicyanobutene-1 and about 60.0 percent of alphamethylstyrene with about 85 parts of an acrylonitrile homopolymer having a weight average molecular weight of about 300,000. Comparative tests demonstrate that the blend has a much higher level of processability than the unmodified homopolymer; the color and clarity of articles produced from the blend are very good, and the resistance to gas permeation is excellent.

Thus, it can be seen that the present invention provides novel physical blends of nitrile polymers wherein the physical properties and processing characteristics are well balanced. The desirable processing characteristics are coupled with improved or maintained resistance to gas permeability to provide materials suitable for packaging and other applications. The blends provided may be readily molded and extruded to form superior products with improved optical characteristics. It should be appreciated that although the nitrile polymer may contain as little is 15.0 percent of ethylenically unsaturated nitrile, and although the modifying polymer may contain as little as 5.0 percent of dicyano-butene-1 and no other cyanide-containing monomer, these lower limits can not be applied simultaneously since at least 60.0 percent by weight of the blend must be comprised of monomers containing the cyanide group.

What is claimed is

1. A nitrile polymer blend comprising about 55.0 to 97.0 weight percent of a nitrile polymer and about 45.0 to 3.0 weight percent of a modifying interpolymer compatible therewith, said nitrile polymer having a weight average molecular weight of at least about 150,000 and containing at least 15.0 percent by weight of an ethylenically unsaturated nitrile selected from the group consisting of acrylonitrile, methacrylonitrile, and mixtures thereof, and up to 85.0 percent by weight of at least one copolymerizable monomer elected from the group consisting of ethacrylonitrile, propacrylonitrile, monovinylidene aromatic hydrocarbons, alkyl (alk) acrylates, acrylamides, N-alkyl acrylamides, vinyl naphthalene, dialkyl maleates and dialkylfumarates; said modifying interpolymer containing at least 5.0 percent by weight of a dicyanobutene-1 selected from the group consisting of 1,3-dicyanobutene-1, 1,4-dicyanobutene-1, and 2,4-dicyanobutene-4 1 and 20.0 to 95.0 percent by weight of at least one copolymerizable monomer selected from the class consisting of ethylenically unsaturated nitriles monovinylidene aromatic hydrocarbons, alkyl (alk)arcylates, dialkyl maleates and dialkyl fumarates, at least about 60.0 percent by weight of said blend being additionally of monomers containing the cyanide group. percent, 2. The blend of claim 1 additisnally containing up to about 20.0 per cent, based upon the total weight of said blend, of a preformed rubbery polymer.

3. The blend of claim 1 comprising about 70.0 to 95.0 percent of said nitrile polymer and about 30.0 to 5.0 weight percent of said modifying interpolymer, said nitrile polymer containing at least 50.0 percent by weight of said ethylenically unsaturated nitrile and said modifying interpolymer comprising about 10.0 to 50.0 weight percent of dicyanobutene-1 and about 90.0 to 50.0 weight percent of said copolymerizable monomer.

4. The blend of claim 1 comprising about 80.0 to 90.0 weight percent of said nitrile polymer and about 20.0 to 10.0 weight percent of said modifying interpolymer, said nitrile polymer containing at least about 75.0 weight percent of said ethylenically unsaturated monomer and said modifying interpolymer comprising about 25.0 to 40.0 weight percent of dicyanobutene-1 and about 75.0 to 60.0 weight percent of said copolymerizable monomer.

5. The blend of claim 2 wherein said preformed rubbery polymer is a diene rubber and at least a portion of said nitrile polymer is grafted thereupon.

6. The blend of claim 2 wherein said preformed rubbery polymer is a diene rubber present in an amount of about 5.0 to 15.0 percent based upon the weight of said modifying interpolymer, and wherein at least a portion of said modifying interpolymer is grafted thereupon.

7. The blend of claim 1 wherein said nitrile polymer is selected from the group consisting of acrylonitrile homopolymers and copolymers thereof with a monomer selected from the class consisting of styrene, alpha-alkyl styrenes, ring chlorinated analogs of styrene and alpha-alkyl styrenes, (alk)acrylic acids, (alk)acrylic acid esters, vinyl esters and mixtures thereof, said dicyanobutene-1 being 2,4-dicyanobutene-1.

8. The blend of claim 1 wherein said nitrile polymer is selected from the group consisting of methacrylonitrile homopolymers and copolymers thereof with a monomer selected from the class consisting of styrene, alpha-alkyl styrenes, ring chlorinated analogs of styrene and alpha-alkyl styrenes, (alk)acrylic acids, (alk)acrylic acid esters and mixtures thereof, said dicyanobutene-1 being 2,4dicyanobutene-1.

9. The blend of claim 1 wherein said nitrile polymer has a weight average molecular weight of at least about 250,000.

PO-1050
(5/69)

UNITED STATES PATENT OFFICE
CERTIFICATE OF CORRECTION

Patent No. 3,607,978                               Dated  September 21, 1971

Inventor(s) Yoon C. Lee & Quirino A. Trementozzi

It is certified that error appears in the above-identified patent and that said Letters Patent are hereby corrected as shown below:

Column 2, line 41, delete "ethacrylonitrilealpha-methylstyrene".

Column 2, delete lines 47-50 beginning "(e.g., ar-alkyl-".

Column 4, line 3, after "etc." insert a - - - parenthesis ( ) ) - - -.

Column 4, line 25, delete "through and insert - - - though - - -.

Column 7, Claim 1, line 10, delete "elected" and insert - - - selected - - -.

Column 7, Claim 1, line 17, delete "dicyanobutene-4 1" and insert - - - dicyanobutene-1 - - -.

Column 8, Claim 2, line 1 delete "additisnally" and insert - - - additionally - - -.

Signed and sealed this 29th day of February 1972.

(SEAL)
Attest:

EDWARD M. FLETCHER, JR.                ROBERT GOTTSCHALK
Attesting Officer                       Commissioner of Patents